United States Patent [19]

Rockwood

[11] Patent Number: 4,514,925
[45] Date of Patent: May 7, 1985

[54] FOLDING NET MECHANISM

[76] Inventor: Albert M. Rockwood, 505 Ruddiman Dr., N. Muskegon, Mich. 49445

[21] Appl. No.: 458,667

[22] Filed: Feb. 28, 1983

[51] Int. Cl.³ .............................................. A01K 77/00
[52] U.S. Cl. ........................................................ 43/12
[58] Field of Search .................................. 43/12, 11, 1

[56] References Cited

U.S. PATENT DOCUMENTS

| 2,491,703 | 12/1949 | Bell | 43/12 |
| 2,567,059 | 9/1951 | Deeble | 43/12 |
| 3,715,829 | 2/1973 | Hamilton | 43/12 |

FOREIGN PATENT DOCUMENTS

| 524686 | 5/1921 | France | 43/12 |
| 622096 | 2/1927 | France | 43/12 |
| 626525 | 5/1927 | France | 43/12 |
| 9804 | of 1896 | United Kingdom | 43/12 |
| 731939 | 5/1980 | U.S.S.R. | 43/12 |

Primary Examiner—Gene P. Crosby

[57] ABSTRACT

A folding net mechanism is disclosed which latches the net arms in the extended position and provides a detent for the arms in the folded position.

4 Claims, 4 Drawing Figures

FOLDING NET MECHANISM

This invention relates to a folding net for fishermen. Over the years there has existed a need for a net which can be carried conveniently through brush without becoming entangled. While a folding net serves this purpose, it must be strong enough to land large fish, have a long enough handle to reach the fish from awkward places such as banks or logs, and be easy to carry. Since the angler has one hand busy with his rod when landing a fish, the net must be so constructed that it can be easily and reliably put into service with the remaining hand.

Such is the nature of my invention as disclosed in the accompanying drawing.

Figure 1:
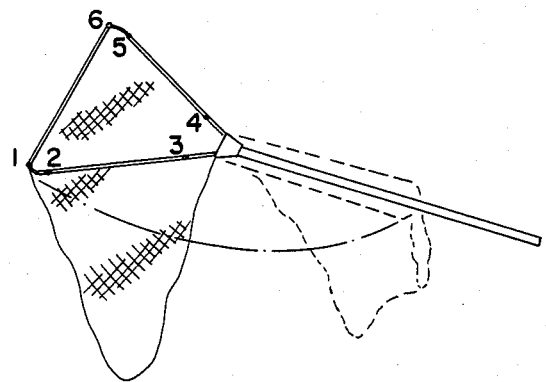
FIG. 1 is a general view of the net, illustrating both its extended and folded positions.
Figure 2:
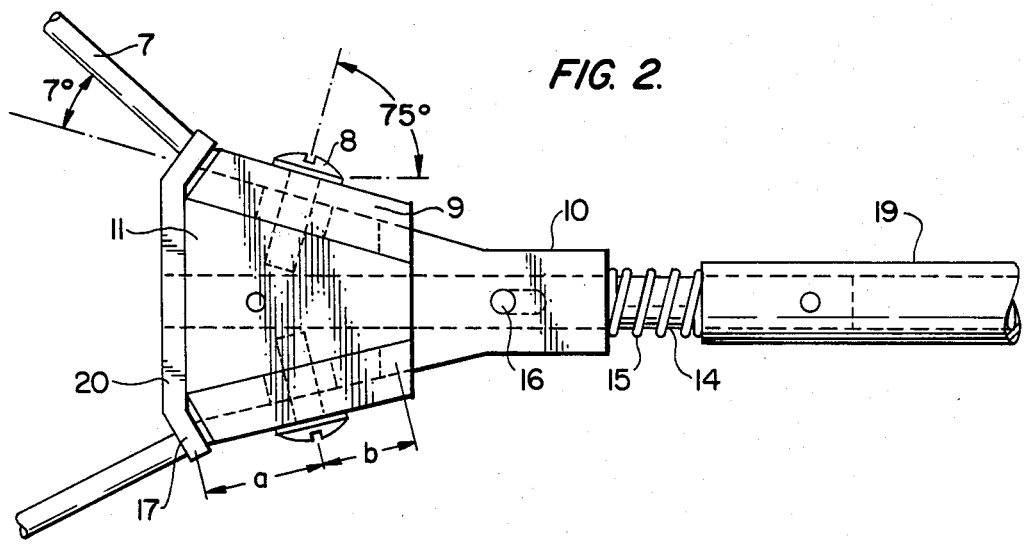
FIG. 2 is a plan view of the mechanism, showing the general arrangement of essential parts.

The net assembly consists basically of a handle and two arms pivotally attached thereto. When extended as shown in FIG. 1, the two arms form a triangle approximately 14 inches on a side. The third side is formed by a nylon-covered steel cable attached through holes in the ends of the arms. The net, threaded through by both arms and cable, is fastened to the frame at six points. This attachment method insures that the net will fall freely away from the frame during the extension of the arms.

The net in its folded position looks as shown by dotted lines, its overall length reduced to two feet (the length of the handle) from its extended length of three feet with an overall width of three inches. This compact form is dictated by the shape of the support block and the angular bend in each arm, the two cooperating to change the overall width of the net from 15 inches to 3 inches as the arms pivot 180 degrees.

Figure 3:
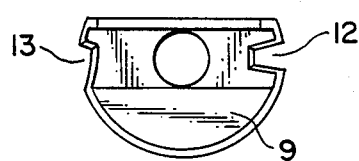
FIG. 3 is a plan view of the left arm support illustrating the position of the latch and detent notches.

The arms (7) pivot about retaining screws (8) and rotate the arm supports (9) into which they are recessed. In both the folded and extended positions, the arm supports are restrained by latch (10) whose two teeth straddle the support block (11) and engage notches (12) in the extended position and detents (13) in the folded position. See FIG. 3. The latch slides on rod (14) and is urged into engagement with the conical form of the arm supports by spring (15). It is also guided by pin (16) which moves back and forth in a slot in rod (14) and serves to keep the latch from rotating about the rod.

The slotted rod (14) is brazed to plate (20) and, on assembly, is pinned to both the handle (19) and the support block (11) holding all parts in proper relation to each other, and keeping spring (15) under compression at all times.

It will now be apparent that the net with its arms extended as shown in FIG. 1 is rigid and can support a load without collapsing whether the net assembly is right side up or upside down. In the former case the load is transmitted from net to arms to arm supports, then divided between pivots and latch teeth. In the inverse position the load is also supported by tabs (17) on the plate (20) which also limit movement of the arms in the extended direction and position the arm supports so that the latch can engage. The distances A and B, approximately $\frac{5}{8}''$, are critical to the structural integrity of the net assembly. With 10 pounds in the net the load on the pivot and the latch approaches 70 pounds. If distances A and B are shortened significantly, the load would be sufficient to break either the pivot or the latch.

To fold the net the fisherman must pull back momentarily on latch (10), releasing the arms which may then swing back to their detented position.

To unfold his net the fisherman simply grasps it at any point along the handle and flips it sharply. Inertia of the arms is sufficient to disengage them from the detents (13). As the arms rotate toward the extended position, the latch is held out of engagement by the conical form of the arm support until the latch notches come into allignment.

Construction is such that the load is carried by metal members: arms, plate, rod, pivot, and handle, while the remaining parts: arms supports, latch, and support block can be molded from plastic. These moving parts being of nylon provide low friction bearing surfaces which move freely in the unlubricated conditions encountered in use. The detent design and conical form of the arm support surfaces minimize frictional force as the arms rotate from folded to extended position.

Figure 4:
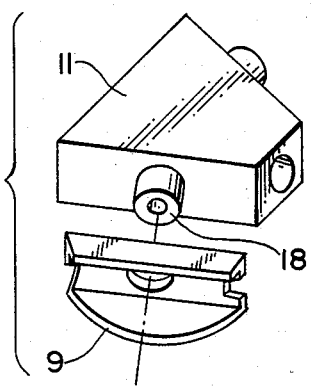
FIG. 4 illustrates a preferred method for mounting the arm support to the support block.

A further advantage of this construction permits bosses (18) shown in FIG. 4 to be molded as a part of the support block serving both as bearings for the arm supports and threaded receptacles for the pivot screws. It is thereby possible to provide a half inch thread engagement to lock the pivot screws securely when tightened against rod (14).

The entire design utilizing high strength metals and plastic parts where possible permits the construction of an exceptionally strong frame of good size with an overall weight of less than $\frac{5}{8}$ of a pound.

I claim as my invention:

1. A folding fishing net comprising a handle; a support block attached to said handle; two arms pivotally attached to said support block so as to rotate at an angle to the handle; a net attached to both arms and supported on a third side by a flexible interconnecting member; pivoting arm supports into which the arms are recessed, said pivoting arm supports having a truncated conical form about the outer periphery thereof, said pivoting arm supports each carrying a latching notch at one end of the conical form; a single latch element slidably mounted to the handle having protrusions in line with the axis of the handle designed to engage the latching notches; the latch being spring loaded so that its protrusions are in continuous contact with the conical form of the arm supports until they can engage both notches when both arms are fully extended.

2. A folding fishing net of claim 1 in which the arms are pivoted about an axis of approximately 70 degrees to the handle and are bent approximately 10 degrees from the plane of rotation.

3. A folding fishing net comprising a handle; a support block attached to said handle; two arms pivotally attached to said support block so as to rotate at an angle to the handle; a net attached to both arms and supported on a third side by a flexible interconnecting member; pivoting arm supports, into which the arms are recessed, said pivoting arm supports having a truncated conical form about the outer periphery thereof, said pivoting arm supports each carrying a latching notch at one end of the conical form and a detent at the other end of the conical form; a single latch element slidably mounted to the handle having protrusions in line with the axis of the handle designed to engage the latching notches and the detents; the latch being spring loaded so that its protrusions are in continuous contact with the conical forms of the arm supports from the time they leave the detent until they can engage both notches when both arms are extended; tabs provided to limit the extended travel of both arms.

4. A folding fishing net of claim 3 in which the arms are pivoted about an axis of 70 degrees to the handle and are bent approximately 10 degrees from the plane of rotation.

* * * * *